July 12, 1966     F. K. H. NALLINGER     3,260,187
HEATING INSTALLATION FOR VEHICLES
Filed Feb. 24, 1964
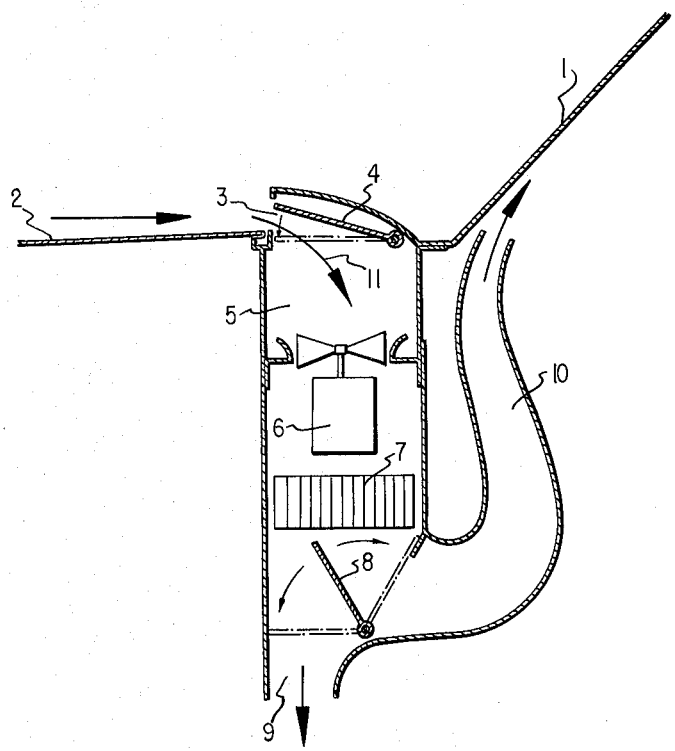
INVENTOR.
FRIEDRICH K. H. NALLINGER
BY *Dicke & Craig*
ATTORNEYS.

United States Patent Office 3,260,187
Patented July 12, 1966

3,260,187
HEATING INSTALLATION FOR VEHICLES
Friedrich K. H. Nallinger, 5 Albrecht-Duerer-Weg,
Stuttgart, Germany
Filed Feb. 24, 1964, Ser. No. 346,987
Claims priority, application Germany, Feb. 26, 1963,
N 22,807
10 Claims. (Cl. 98—2)

The present invention relates to a heating installation for vehicles, especially motor vehicles, with at least one air inlet aperture and air ducts adjoining the air inlet aperture, through which the air can be supplied at least in part to the vehicle interior space and in particular is adapted to be conducted onto the windshield, and in which are arranged a blower, a heat exchanger and possibly air distributor valves or the like.

The heating installations of this type known heretofore have the disadvantage that with certain temperature and humidity conditions the air inlet becomes frozen up or iced up and slowly grows together so that the heat output of the installation decreases slowly. As a result thereof not only the temperature drops within the vehicle interior space but also the defrosting of the windshield decreases so that the windshield in due course becomes covered wth ice. In such cases, nothing else remained to be done heretofore but to stop the vehicle and to get out to clean the air inlet aperture. This is not only time-consuming and laborious but also the vehicle may thereby become damaged and the person cleaning the vehicle may dirty himself or herself or even be hurt if the removal of the ice is realized, for example, with a sharp tool. Similar disadvantageous conditions result if in case of snowfall the air inlet aperture during snowfall becomes snowed-in or if an air inlet flap or valve freezes in an unfavorable position.

The present invention is based on the aim to eliminate the aforementioned shortcomings. This task is solved in accordance with the present invention in that for the de-icing or thawing out of the air inlet aperture and/or for the unthawing of the air inlet flap or valve means are provided to conduct a warm air stream to the air inlet aperture. The de-icing effected by the warm air is very effective and takes place above all without any harmful load on the vehicle. With very unfavorable weather conditions it may still become necessary at times to stop the vehicle for purposes of de-icing or at least to decrease the speed thereof, however, a good de-icing of the air inlet aperture is assured even in such case without manual intervention.

The means for the deflection and reversal of the air stream may consist, for example, of suitably shaped deflection channels and/or reversing ducts in combination with corresponding air flaps or valves. The means, according to a further feature of the present invention, may thereby be so constructed that air is drawn or sucked-out of the vehicle interior and is supplied to the air inlet aperture by way of the heat exchanger. The amount of heat supplied per unit time to the air inlet aperture for de-icing the same is thus particularly large and the de-icing is considerably accelerated thereby.

According to a preferred embodiment the heating installation of the present invention is equipped with an axial blower whose direction of rotation is adapted to be reversed for purposes of de-icing. Such an installation excels by a particularly simple construction and particularly high efficiency.

Accordingly, it is an object of the present invention to provide a heating installation of the type described hereinabove which effectively eliminates, by simple means, the drawbacks and shortcomings encountered with the prior art systems.

Another object of the present invention resides in the provision of a heating installation, especially for motor vehicles, which prevents any possible decrease in the heater output as a result of icing-up or freezing-up of the air inlet aperture and/or control flap associated therewith under poor climatic conditions.

Still another object of the present invention resides in the provision of a heating installation for vehicles, especially motor vehicles, which assures a high heat output of the system under all driving conditions, and which in particular assures reliable defrosting of the windshield at all times.

Still a further object of the present invention resides in the provision of a heating system for motor vehicles which obviates the need for time-consuming and laborious cleaning and/or de-icing of the air inlet apertures and/or lids associated therewith.

A further object of the present invention resides in the provision of a heating installation for vehicles, especially motor vehicles, which eliminates the need for manual cleaning of the air inlet aperture, control flaps and/or actuating mechanisms associated with the flaps for the inlet apertures.

A still further object of the present invention resides in the provision of a heating installation, especially for motor vehicles, which permits, by extremely simple and inexpensive means, a thawing-out of the air inlet aperture for the heating system and/or the lid associated therewith.

Another object of the present invention resides in the provision of a heating installation for motor vehicles which facilitates application of warm air to the air inlet aperture and/or to the lid associated therewith to assure a constant cross section as well as proper operation of the selectively operable lid under all driving conditions.

Still a further object of the present invention resides in the provision of a heating installation for vehicles, especially motor vehicles, which enables a rapid and simple de-icing and thawing-out of the air inlet aperture or apertures and/or lids and actuating mechanisms associated therewith.

These and other objects, features and advantages of the present invention will become more obvious from the following description when taken in connection with the accompanying drawing which shows, for purposes of illustration only, in the single figure thereof, one embodiment in accordance with the present invention.

Referring now to the single figure of the drawing which is a schematic longitudinal cross section through the front part of a passenger motor vehicle equipped with a heating installation according to the present invention, there is arranged within the area of the lower edge of the windshield 1 and adjoining the engine hood 2 an air inlet aperture 3 which is adapted to be selectively closed to a greater or lesser extent by means of an air inlet flap or lid 4 of any conventional construction. An air duct 5 adjoins the air inlet aperture 3 within which is arranged an axial blower 6 and a heat exchanger 7 of conventional construction. The air normally drawn-in by the blower 6 through the inlet aperture 3 and flowing through the heat exchanger 7 is conducted, depending on the position of the distributor valve or flap 8, through the outlet 9 to the foot space of the vehicle and/or through the further duct or channel 10 to the inside of the windshield 1 for defrosting the latter.

The heat output of the installation and therewith also the effectiveness of the defrosting of the windshield 1 decreases to the extent as the air stream 11 is throttled by a decrease of the cross section of the air inlet aperture 3. It is therefore necessary to prevent icing-up or freezing-up of the air inlet aperture 3 as much as possible or, when it has occurred, to eliminate the same again. For this purpose, the axial blower 6 is so constructed that the direction of rotation thereof and therewith its direction of feed is reversible. It thereby suffices to so construct the motor of the axial blower 6, in a manner known per se, that the motor changes its direction of rotation with a polarity reversal. Thus, by means of a simple contact pressure or the like, already warm air is now drawn out of the interior space of the vehicle and is supplied after further heating in the heat exchanger 7 to the air inlet aperture 3. In this manner, sufficient air is supplied to the air inlet aperture 3 in order to effect a rapid de-icing of this aperture.

While I have shown and described one embodiment in accordance with the present invention, it is understood that the same is not limited thereto but is susceptible of numerous changes and modifications as known to a person skilled in the art. For example, the present invention is applicable to all usual types of heating and air conditioning installations and may also be realized, for example, by the provision of separate air ducts and air flaps and especially by reversal of the feed direction of the respective blower utilized in a particular case.

Thus, it is obvious that the present invention is not limited to the details shown and described herein but is susceptible of numerous changes and modifications, and I therefore do not wish to be limited to the details shown and described herein but intend to cover all such changes and modifications as are encompassed by the scope of the appended claims.

I claim:

1. A heating device for vehicles, particularly motor vehicles comprising:
   air inlet means having an air inlet valve,
   air duct means to conduct the air from said air inlet means partly to the interior of the vehicle and partly toward the windshield thereof,
   a first portion of said air duct means being connected to said air inlet means and extending in a substantially vertical direction,
   heat exchanger means within said first portion to heat the air,
   reversible fan means within said first portion between said heat exchanger means and said air inlet means to selectively move air through said duct means toward the windshield and into the interior of the vehicle for heating purposes in one direction of rotation thereof, and in the other direction of rotation, move air out of said air inlet means for defrosting said air inlet means.

2. The heating device of claim 1, including a second portion of said air duct means extending from the bottom of said first portion upwardly toward the windshield, the lower end of said first portion opening directly into the bottom space of the motor vehicle,
   valve means to control the relative rates of flow between said second portion and the opening into the bottom of said vehicle.

3. A heating device for vehicles having an engine, comprising:
   outside duct means open to the outside of the vehicle to receive and discharge air directly from and directly to the outside;
   said outside duct means being located at a position removed from the engine;
   means, including structural elements of the vehicle located between the engine and said outside duct means, to substantially entirely prevent engine heat from reaching said outside duct means in a quantity sufficient to prevent ice from forming thereat during extreme conditions of weather;
   inside duct means open to the inside of the vehicle;
   conduit means to conduct air between said outside duct means and said inside duct means and having a first end attached to said inside duct means and a second end attached to said outside duct means;
   heat exchange means within said conduit means, between said inside and said outside duct means, to heat the air in said conduit means;
   reversible fan means, within said conduit means, between said inside and said outside duct means, to blow the air from said outside duct means through said inside duct means to heat the inside of the vehicle;
   means to selectively reverse said fan means and to blow heated air through said outside duct means to melt any ice formation on said outside duct means.

4. The heating device of claim 3, wherein said inside duct means opens only to the interior of the vehicle.

5. The heating device of claim 3, including valve means, within said outside duct means, to control the flow of air through said outside duct means.

6. The heating device of claim 4 including valve means, within said outside duct means, to control the flow of air through said outside duct means.

7. The heating device of claim 3, wherein a first portion of said conduit means, containing said fan means and said heat exchange means, extends in a generally vertical direction.

8. The device of claim 7 wherein a second portion of said conduit means extends from the bottom of said first portion upwardly toward the windshield to deliver air to the windshield of the vehicle.

9. The heating device of claim 7 wherein said inside duct means only opens to the interior of the vehicle.

10. The heating device of claim 8, wherein said inside duct means only opens to the interior of the vehicle.

References Cited by the Examiner

UNITED STATES PATENTS

| 2,151,865 | 3/1939 | Nallinger | 237—12.3 |
| 2,270,823 | 1/1942 | Meyerhoefer | 165—97 |
| 2,738,718 | 3/1956 | Reynolds | 98—2.4 |

EDWARD J. MICHAEL, *Primary Examiner.*